(12) United States Patent
Justice et al.

(10) Patent No.: US 10,159,901 B2
(45) Date of Patent: *Dec. 25, 2018

(54) CLIENT SIDE PROCESSING OF CHARACTER INTERACTIONS IN A REMOTE GAMING ENVIRONMENT

(71) Applicant: MICROSOFT TECHNOLOGY LICENSING, LLC, Redmond, WA (US)

(72) Inventors: John Raymond Justice, Bellevue, WA (US); J. Andrew Goossen, Issaquah, WA (US); David Wu, Redmond, WA (US); Habib Zargarpour, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,322

(22) Filed: Jun. 9, 2017

(65) Prior Publication Data
US 2017/0274284 A1    Sep. 28, 2017

Related U.S. Application Data

(63) Continuation of application No. 14/179,154, filed on Feb. 12, 2014, now Pat. No. 9,694,277.
(Continued)

(51) Int. Cl.
*A63F 9/00* (2006.01)
*A63F 13/60* (2014.01)
(Continued)

(52) U.S. Cl.
CPC .............. *A63F 13/60* (2014.09); *A63F 13/00* (2013.01); *A63F 13/12* (2013.01); *A63F 13/55* (2014.09);
(Continued)

(58) Field of Classification Search
None
See application file for complete search history.

(56) References Cited

U.S. PATENT DOCUMENTS 5,838,909 A    11/1998    Roy et al.
6,038,599 A     3/2000    Black et al.
(Continued)

FOREIGN PATENT DOCUMENTS

CN    202460088 U    10/2012
EP    1585062 A2    10/2005
(Continued)

OTHER PUBLICATIONS

"Non-Final Office Action Issued in U.S. Appl. No. 13/554,215", dated May 30, 2014, 14 Pages.
(Continued)

*Primary Examiner* — Seng H Lim
(74) *Attorney, Agent, or Firm* — Shook, Hardy & Bacon L.L.P.

(57) ABSTRACT

Embodiments of the present invention split game processing and rendering between a client and a game server. A rendered video game image is received from a game server and combined with a rendered image generated by the game client to form a single video game image that is presented to a user. Control input is received by a client device and then communicated to a game server, potentially with some preprocessing, and is also consumed locally on the client, at least in part. An embodiment of the present invention processes and renders some or all of a character's interactions with game objects on the client device associated with the character. A character is associated with a client device when control input associated with the character is received from a user of the client device.

20 Claims, 12 Drawing Sheets

Related U.S. Application Data

(60) Provisional application No. 61/783,388, filed on Mar. 14, 2013.

(51) Int. Cl.
  *A63F 13/30* (2014.01)
  *A63F 13/55* (2014.01)
  *A63F 13/00* (2014.01)

(52) U.S. Cl.
  CPC ..... *A63F 2300/538* (2013.01); *A63F 2300/66* (2013.01)

(56) References Cited

U.S. PATENT DOCUMENTS

| | | | |
|---|---|---|---|
| 6,377,257 B1 | 4/2002 | Borrel et al. |
| 6,415,317 B1 | 7/2002 | Yelon et al. |
| 6,884,172 B1 | 4/2005 | Lloyd et al. |
| 7,587,520 B1 | 9/2009 | Kent et al. |
| 7,603,406 B2 | 10/2009 | Gulliver et al. |
| 7,887,416 B2 | 2/2011 | Katsume et al. |
| 7,889,669 B2 | 2/2011 | Abigail |
| 7,971,157 B2 | 6/2011 | Markovic et al. |
| 8,038,535 B2 | 10/2011 | Jensen |
| 8,092,307 B2 | 1/2012 | Kelly |
| 8,151,199 B2 | 4/2012 | Gerson et al. |
| 8,176,437 B1 | 5/2012 | Taubman |
| 8,264,493 B2 | 9/2012 | Peterfreund |
| 8,668,582 B1 | 3/2014 | Overton |
| 8,888,592 B1 | 11/2014 | Pereira et al. |
| 8,968,087 B1 | 3/2015 | Gault et al. |
| 2002/0142843 A1 | 10/2002 | Roelofs |
| 2004/0003039 A1 | 1/2004 | Humphrey et al. |
| 2004/0030882 A1 | 2/2004 | Forman |
| 2004/0082388 A1 | 4/2004 | Simsek et al. |
| 2004/0135805 A1 | 7/2004 | Gottsacker et al. |
| 2004/0193813 A1 | 9/2004 | Nguyen et al. |
| 2006/0063590 A1 | 3/2006 | Abassi et al. |
| 2006/0135258 A1 | 6/2006 | Maheshwari et al. |
| 2006/0281511 A1 | 12/2006 | Holm et al. |
| 2007/0173325 A1 | 7/2007 | Shaw et al. |
| 2007/0195097 A1 | 8/2007 | Heesemans |
| 2007/0232396 A1 | 10/2007 | Yoo |
| 2008/0037534 A1 | 2/2008 | Shina |
| 2008/0207322 A1 | 8/2008 | Mizrahi |
| 2009/0094600 A1 | 4/2009 | Sargaison et al. |
| 2009/0111574 A1 | 4/2009 | Rowe |
| 2009/0111576 A1 | 4/2009 | Ostergren et al. |
| 2009/0118019 A1 | 5/2009 | Perlman et al. |
| 2009/0119729 A1 | 5/2009 | Periman et al. |
| 2009/0215538 A1 | 8/2009 | Jew |
| 2009/0247295 A1 | 10/2009 | Weldon et al. |
| 2009/0278842 A1 | 11/2009 | Peterfreund |
| 2010/0197405 A1 | 8/2010 | Douceur et al. |
| 2010/0229108 A1 | 9/2010 | Gerson et al. |
| 2010/0304860 A1 | 12/2010 | Gault et al. |
| 2010/0306813 A1 | 12/2010 | Perry et al. |
| 2011/0025689 A1 | 2/2011 | Perez et al. |
| 2011/0055135 A1 | 3/2011 | Dawson et al. |
| 2011/0086706 A1 | 4/2011 | Zalewski |
| 2011/0088071 A1 | 4/2011 | Yerli |
| 2011/0096089 A1 | 4/2011 | Shenhav et al. |
| 2011/0145362 A1 | 6/2011 | Jones et al. |
| 2011/0157196 A1 | 6/2011 | Nave et al. |
| 2011/0210982 A1 | 9/2011 | Sylvan et al. |
| 2011/0225040 A1 | 9/2011 | Yerli |
| 2011/0250949 A1 | 10/2011 | van Os et al. |
| 2011/0256912 A1 | 10/2011 | Baynes et al. |
| 2011/0263332 A1 | 10/2011 | Mizrachi |
| 2012/0004039 A1 | 1/2012 | Perry et al. |
| 2012/0004041 A1 | 1/2012 | Pereira et al. |
| 2012/0004042 A1 | 1/2012 | Perry et al. |
| 2012/0009997 A1 | 1/2012 | Youm |
| 2012/0064968 A1 | 3/2012 | Youm et al. |
| 2012/0064976 A1 | 3/2012 | Gault et al. |
| 2012/0072911 A1 | 3/2012 | Whaley et al. |
| 2012/0079095 A1 | 3/2012 | Evans et al. |
| 2012/0299938 A1 | 11/2012 | Iwasaki |
| 2013/0046893 A1 | 2/2013 | Hauser et al. |
| 2013/0025287 A1 | 8/2013 | Bendayan et al. |
| 2013/0344966 A1 | 12/2013 | Mustafa |
| 2014/0040970 A1 | 2/2014 | Alexander et al. |
| 2014/0179421 A1 | 6/2014 | Quinn et al. |

FOREIGN PATENT DOCUMENTS

| | | |
|---|---|---|
| EP | 1640047 A1 | 3/2006 |
| EP | 1779909 A2 | 5/2007 |
| EP | 2340877 A2 | 7/2011 |
| EP | 2340878 A2 | 7/2011 |
| WO | 199932990 A2 | 7/1999 |
| WO | 200136061 | 5/2001 |
| WO | 3075116 A2 | 9/2003 |
| WO | 2006100664 A2 | 9/2006 |
| WO | 2007119236 A2 | 10/2007 |
| WO | 2005061068 A1 | 5/2008 |
| WO | 2012107739 A2 | 8/2012 |
| WO | 2012166305 A1 | 12/2012 |
| WO | 2013006802 A1 | 1/2013 |
| WO | 2013023069 A2 | 2/2013 |
| WO | 2014100583 A1 | 6/2014 |

OTHER PUBLICATIONS

"Notice of Allowance Issued in U.S. Appl. No. 13/554,215", dated Oct. 20, 2014, 8 Pages.
"Final Office Action Issued in U.S. Appl. No. 13/593,843", dated Sep. 29, 2014, 14 Pages.
"Final Office Action Issued in U.S. Appl. No. 13/593,843", dated Oct. 23, 2015, 16 Pages.
"Non-Final Office Action Issued in U.S. Appl. No. 13/593,843", dated Apr. 10, 2015, 10 Pages.
"Non-Final Office Action Issued in U.S. Appl. No. 13/593,843", dated Feb. 5, 2014, 17 Pages.
"Notice of Allowance Issued in U.S. Appl. No. 13/593,843", dated Mar. 14, 2016, 8 Pages.
"Final Office Action Issued in U.S Appl. No. 13/723,498", dated May 7, 2015, 9 Pages.
"Final Office Action Issued in U.S. Appl. No. 13/723,498", dated Dec. 2, 2016, 9 Pages.
"Non-Final Office Action Issued in U.S. Appl. No. 13/723,498", dated Mar. 11, 2016, 8 Pages.
"Non-Final Office Action Issued in U.S. Appl. No. 13/723,498", dated Sep. 30, 2014, 12 Pages.
"Notice of Allowance Issued in U.S. Appl. No. 13/723,498", dated Apr. 7, 2017, 8 Pages.
"Final Office Action Issued in U.S. Appl. No. 13/723,652", dated Jan. 26, 2015, 12 Pages.
"Non-Final Office Action Issued in U.S. Appl. No. 13/723,652", dated Jul. 30, 2015, 7 Pages.
"Non-Final Office Action Issued in U.S. Appl. No. 13/723,652", dated Apr. 7, 2016, 8 Pages.
"Non-Final Office Action Issued in U.S. Appl. No. 13/723,652", dated Dec. 4, 2014, 11 Pages.
"Notice of Allowance Issued in U.S. Appl. No. 13/723,652", dated Aug. 8, 2016, 8 Pages.
"Office Action Issued in European Patent Application No. 13742806.6", dated Jun. 24, 2015, 3 Pages.
"Final Office Action Issued in U.S. Appl. No. 14/179,154", dated Feb. 12, 2016, 14 Pages.
"Non-Final Office Action Issued in U.S. Appl. No. 14/179,154", dated Sep. 29, 2015, 14 Pages.
"Non-Final Office Action Issued in U.S. Appl. No. 14/179,154", dated Sep. 2, 2016, 12 Pages.
"Notice of Allowance Issued in US Patent Application No. 14/179,154", dated Mar. 30, 2017, 2 Pages.
"Notice of Allowance Issued in U.S. Appl. No. 14/179,154", dated May 24, 2017, 2 Pages.

(56) References Cited

OTHER PUBLICATIONS

"Notice of Allowance Issued in U.S. Appl. No. 14/179,154", dated Mar. 1, 2017, 5 Pages.
"Non-Final Office Action Issued in U.S. Appl. No. 14/180,043", dated Mar. 11, 2016, 32 Pages.
"Notice of Allowance Issued in U.S. Appl. No. 14/180,043", dated Oct. 5, 2016, 11 Pages.
"Non-Final Office Action Issued in U.S. Appl. No. 14/607,238", dated Jun. 30, 2016, 5 Pages.
"Notice of Allowance Issued in US Patent Application No. 14/607,238", dated Sep. 14, 2016, 8 Pages.
"Notice of Allowance Issued in European Patent Application No. 14723526.1", dated Mar. 11, 2016, 7 Pages.
"Notice of Allowance Issued in European Patent Application No. 14723526.1", dated Jun. 3, 2016, 7 Pages.
"International Search Report and Written Opinion Issued in PCT Application No. PCT/US2014/022712", dated Jul. 31, 2014, 11 Pages.
"International Search Report & Written Opinion Issued in PCT Application No. PCT/US2014/023096", dated Aug. 5, 2014, 10 Pages.
"International Search Report and Written Opinion Issued in PCT Application No. PCT/US2013/051180", dated Oct. 14, 2013, 13 Pages.
"International Search Report and Written Opinion Issued in PCT Application No. PCT/US2013/055234", dated Oct. 31, 2013, 9 Pages.
"International Search Report and Written Opinion Issued in PCT Application No. PCT/US2013/076918", dated Mar. 27, 2014, 11 Pages.
"International Search Report and Written Opinion Issued in PCT Application No. PCT/US2013/076871", dated Mar. 13, 2014, 11 Pages.
"International Preliminary Report on Patentability Issued in PCT Application No. PCT/US2014/023096", dated Jul. 16, 2015, 7 Pages.
"First Office Action and Search Report Issued in Chinese Patent Application No. 201480015325.5", dated Apr. 11, 2017, 17 Pages.
"Second Office Action Issued in Chinese Patent Application No. 201480015325.5", dated Oct. 13, 2017, 14 Pages.
Bernier, Yahn W., "Latency Compensating Methods in Client/Server In-game Protocol Design and Optimization", In Proceedings of the 15th Games Developers Conference, Mar. 2001, 13 pages.
Winter, et al., "A Hybrid Thin-Client Protocol for Multimedia Streaming and Interactive Gaming Applications", In 16th International Workshop on Network and Operating Systems Support for Digital Audio and Video, Nov. 22, 2006, 7 pages.
Bhuvan Urgaonkar et al. Agile Dynamic Provisioning of Multi-Tier Internet Applications, ACM Transactions on Autonomous and Adaptive Systems, vol. 3, No. 1, Mar. 1, 2008 (Mar. 1, 2008), pp. 1-39, XP055081646.
Jurgelionis, et al., "Platform for Distributed 3D Gaming", In International Journal of Computer Games Technology-Special Issue on Cyber Games and Interactive Entertainment, vol. 2009, Article ID 231863, Jan. 2009, 15 pages.
Wang, et al., "Modeling and Characterizing User Experience in a Cloud Server Based Mobile Gaming Approach", In Proceedings of the 28th IEEE Conference on Global Telecommunications, Nov. 30, 2009, pp. 1-7.
Claypool, et al., "Latency Can Kill: Precision and Deadline in Online Games", In Proceedings of the First Annual ACM SIGMM Conference on Multimedia Systems, Feb. 22, 2010, pp. 215-222.
Day, Nathan, ""Building a True Real-Time Multiplayer Gaming Platform"", Published on: Oct. 11, 2011, Available at:.
Chen, et al., "Measuring the Latency of Cloud Gaming Systems", In Proceedings of the 19th ACM International Conference on Multimedia, Nov. 28, 2011, pp. 1269-1272.
Components of a Multiplayer Game, Published on: Jul. 11, 2011, 7 pages, available at: http://www.jenkinssoftware.com/raknel/manual/multiplayergamecomponents.html.
Kim, et al., "Multi-view Rendering Approach for Cloud-based Gaming Services", In The Third International Conference on Advances in Future Internet, Aug. 21, 2011, pp. 102-107.
Leung, et al., "Online Cloud Gaming Service", Published on: May, 2011, 14 pages, SE 172/272 Enterprise Software, Available at: http://www.sjsu.edu/people/rakesh.ranjan/courses/cmpe272/s1/Team%20WS%20OnLive%20Cloud%20Gaming%20Service.pdf.
Marzolla, et al., "Dynamic Resource Provisioning for Cloud-based Gaming Infrastructures", In Proceedings of the ACM Computers in Entertainment, vol. 9, No. 4, Article 39, Mar. 2011, 19 pages.
Shi, Shu, "Reduce Latency: The Key to Successful Interactive Remote Rendering Systems", In IEEE International Conference on Pervasive Computing and Communications Workshops, Mar. 21, 2011, 2 pages.
Kunsemoller, et al., ""A Game-Theoretical Approach to the Benefits of Cloud Computing"", Retrieved on: Jan. 30, 2012.
Shaikh A et al., On Demand Platform for Online Games, IBM Systems Journal, IBM Corp., Armonk, New York, US, vol. 45, No. 1, Jan. 1, 20-03, pp. 7-19, XP002492825.
Raghuraman et al "Immersive Multiplayer Tennis With Microsoft Kinect and Body Sensor Network" Published Oct. 29-Nov. 2, 2012, 4 pages.
Dance Central Game Manual released Nov. 4, 2010, 12 pages.
Machida F et al., Just-In-Time Server Provisioning Using Virtual Machine Standby and Request Prediction, Autonomic Computing, 2008, ICAC, 08, International Confernece on, IEEE, Piscataway, NJ USA, Jun. 2, 2008 (Jun. 2, 2008_ pp. 163-171, XP031276805.
Non-Final Office Action dated Sep. 13, 2017 in U.S. Appl. No. 15/370,894, 11 pages.
Notice of Allowance dated Mar. 29, 2018 in U.S. Appl. No. 15/370,894, 7 pages.
"Jagged Alliance 2", Retrieved From https://v.youku.com/v_show/id_XMzQzNTkxMzAw.html?spm=a2h0k.11417342, 2005, 1 Page.
"Office Action Issued in Chinese Patent Application No. 201480015325.5", dated Jun. 19, 2018, 7 Pages.
"World of Warcraft", Retrieved From http://miqiyi.com/w_19rr317t8t.html?social_plafform=link&pl=2-22-221, 2004, 2 Pages.
"Mobile Application Development and Application Project Practice for Android", 2012, pp. 79-151.
Huailiang, et al., "Human-Computer Interface Design", 2007, pp. 59-131.

CLIENT SIDE PROCESSING OF CHARACTER INTERACTIONS IN A REMOTE GAMING ENVIRONMENT

CROSS-REFERENCE TO RELATED APPLICATIONS

This application is a continuation of U.S. patent application Ser. No. 14/179,154, filed on Feb. 12, 2014, which claims the benefit of U.S. Provisional Application No. 61/783,388, filed Mar. 14, 2013, both of which are herein incorporated by reference.

BACKGROUND

Game servers allow players to connect from different client devices and play together within a multiplayer game. The game servers run game code that is manipulated based on controller input received from the different clients. Game state information is periodically updated and communicated to the individual game clients that render video game images that are consistent with the game state. Exemplary game state information includes a character's movement within a game environment as well as the movement of game objects. Players' scores, strength, and condition may also be recorded within game state information.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention split game processing and rendering between a client and a game server. A rendered video game image is received from a game server and combined with a rendered image generated by the game client to form a single video game image that is presented to a user. Control input is received by a client device and then communicated to a game server, potentially with some preprocessing, and is also consumed locally on the client, at least in part. An embodiment of the present invention processes and renders some or all of a character's interactions with game objects on the client device associated with the character. A character is associated with a client device when control input associated with the character is received from a user of the client device.

Game interactions may take multiple forms including targeting, delivery, and contact. In all forms of interaction, a character may be the subject or object of the interaction or a combination of both. For example, a character could throw balls at other characters and be hit by balls thrown by others. Different games use different onscreen manifestations for targeting, delivery, and contact. In some games, a manifestation may be displayed indicating the character is being targeted by others. This manifestation may be client rendered as part of a character interaction with a game object, even though the character is the object of the interaction rather than the performer.

Targeting interactions involve a first character targeting a game object, such as a second character or ball. As used throughout, the first character is the character controlled by a user associated with the client device on which the first character's interactions are processed and rendered. Targeting may be a preliminary step, but it is not required in all games.

In addition to targeting, game interactions include delivery of the game object that has been targeted. For example, a bullet being fired from a gun or a ball being kicked are both examples of a delivery interaction. In the shooting example, the muzzle flash, audible sounds associated with firing, and a tracer or other indication of bullet trajectory may be rendered on the client and combined with images rendered by a server to depict the delivery interaction.

A third class of game interaction is contact detection. Broadly, contact detection indicates whether a game object contacted an intended target or any target. For example, if a character was shooting at another character, the contact detection would indicate that the character hit the intended target. Manifestations of the hit may be rendered on the client device.

Other types of game interactions may be rendered on the client device and combined with video game images rendered by the server to produce a video game experience for a user. In one embodiment, a character's interaction with game objects are the only features processed on the client and rendered on the client. In a remote multiplayer setting where other players are connected via a network and are not in the same geographic location or play space, then the other character's images are rendered on the server.

BRIEF DESCRIPTION OF THE DRAWINGS

Embodiments of the invention are described in detail below with reference to the attached drawing figures, wherein.

DETAILED DESCRIPTION

Figure 1:
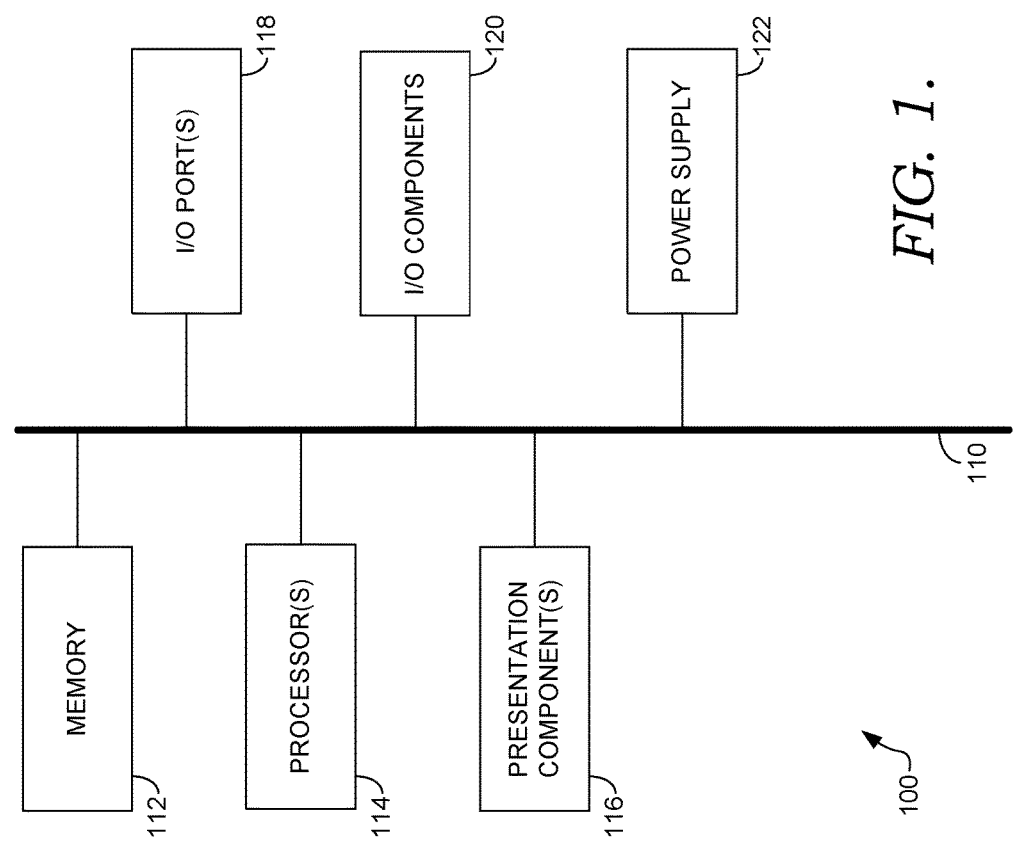
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention split game processing and rendering between a client and a game server. A rendered video game image is received from a game server and combined with a rendered image generated by the game client to form a single video game image that is presented to a user. Control input is received by a client device and then communicated to a game server, potentially with some preprocessing, and is also consumed locally on the client, at least in part. An embodiment of the present invention processes and renders some or all of a character's interactions with game objects on the client device associated with the character. A character is associated with a client device when control input associated with the character is received from a user of the client device.

Game interactions may take multiple forms including targeting, delivery, and contact. In all forms of interaction, a character may be the subject or object of the interaction or a combination of both. For example, a character could throw balls at other characters and be hit by balls thrown by others. Different games use different onscreen manifestations for targeting, delivery, and contact. In some games, a manifestation may be displayed indicating the character is being targeted by others. This manifestation may be client rendered as part of a character interaction with a game object, even though the character is the object of the interaction rather than the performer.

In addition to rendering manifestations related to the interactions on the client, the truth of the game interactions may also be determined on the client in some embodiments. For example, the truth of whether or not a projectile hits its intended target may be determined on the client and communicated to the game server, which in turn updates game state information across all characters and devices connected to the game session. In another embodiment, the truth of a contact is determined by the server and communicated to all devices as appropriate. The client hit determination may be preliminary and used for the purpose of generating an immediate manifestation rather than changing the game score or resulting in a multiplayer setting.

Targeting interactions involve a first character targeting a game object, such as a second character or a ball. As used throughout, the first character is the character controlled by a user associated with the client device on which the first character's interactions are processed and rendered. In an action game involving shooting a gun, images associated with targeting may include a gun lining up with the target and a reticle moving over a targeted object. A sports game may involve directing an anticipated sports action toward a game object, such as another character or a ball. For example, in a golf game, the target arrow may be moved over a golf ball and strength of swing information input. Additionally, the user may be able to select a club as part of targeting, which clubs may then be rendered on the client along with dials, bar graphs, color indications or other game features that communicate a selected strength of swing. All of these targeting actions toward the golf ball may be processed on the client and manifestations that are consistent with the targeting data may be rendered on the client. The rest of the scene may be rendered on the game server and communicated to the client for compositing. Z-buffer data and other information needed to correctly composite the images may also be provided by the game server.

In a multiplayer game such as soccer or football where a user can choose to play different characters on a team at different times, targeting may involve a selection method allowing the user to select an individual character to play. Targeting may include manifesting targeting, which helps to show which way a ball will be kicked or thrown based on current input or game state.

In a baseball game, targeting could involve a swing strength, timing, and placement. All of these could be manifested by character movements that are rendered on the client. The character movements could include movements of a bat or other game object. Targeting may be a preliminary step, but it is not required in all games.

In addition to targeting, game interactions include delivery of the game object that has been targeted. For example, a bullet being fired from a gun or a ball being kicked are both examples of a delivery interaction. In the shooting example, the muzzle flash, audible sounds associated with firing, and a tracer or other indication of bullet trajectory may be rendered on the client and combined with images rendered by a server to depict the delivery interaction.

Similarly, a ball's movement in response to being kicked or thrown may be depicted on the client. The ball's trajectory may also be calculated by the client. Where appropriate, the client rendering may include a depiction of the character. For example, when the delivery interaction is kicking a ball, the character may be client rendered and shown kicking the ball. In a third-person shooter game, the character being controlled by the user of the client device may be client rendered in conjunction with the character interactions.

The third class of game interaction is contact detection. Broadly, contact detection indicates whether a game object contacted an intended target or any target. For example, if a character was shooting at another character, the contact detection would indicate that the character hit the intended target. Manifestations of the hit may be rendered on the client device.

In one embodiment, the hit detection is also performed on the server. On the client, the hit detection may be performed using geometry representing game objects. The geometry may be received from the server as the game state changes. The game geometry may represent different game objects using geometric shapes. For example, other characters may be represented using cylinders. The client performs a hit detection to determine whether or not an indication of a contact or hit should be rendered and displayed. In one embodiment, the client hit detection is a preliminary detection and may be overridden by a server determination that is better able to synchronize multicharacter movement and locations. In this case, the hit information or shot information may be communicated with a time stamp that is compared against another game object's location on the server.

Other types of game interactions may also be rendered on the client device and combined with video game images rendered by the server to produce a video game experience for a user. In one embodiment, a character's interaction with game objects are the only features processed on the client and rendered on the client. In a remote multiplayer setting where other users are connected via a network and are not in the same geographic location or play space, then the other user's characters are rendered on the server.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
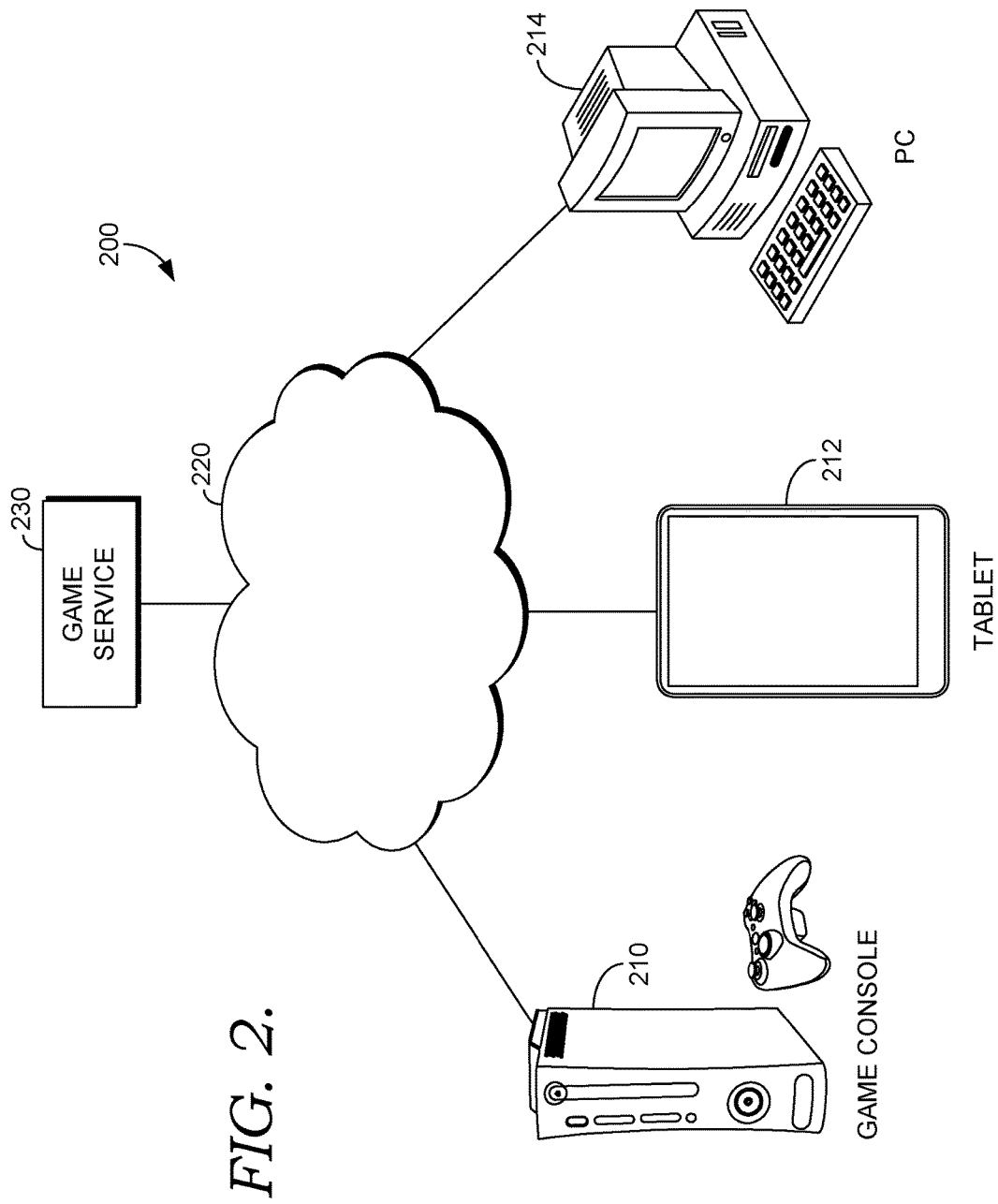
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones and televisions, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich data stream and a basic data stream. Individual controllers are capable of generating different kinds of data streams and a single controller could generate both a rich data stream and an basic data stream.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The classification of an input stream as rich or basic depends on the latency caused to the game by uploading the full control stream. Factors such as available bandwidth and client capabilities may affect the classification. In one embodiment, a data stream that adds more than 80 ms of roundtrip latency during communication to a game server is classified as rich. Roundtrip latency refers to the total delay between the user providing an input, such as pushing a button, and seeing the result (e.g., avatar movement) of the input on the display. Unless otherwise specified in this disclosure, the term latency refers to roundtrip latency. Thus, the terms latency and roundtrip latency are used interchangeably. The 80 ms of latency is in addition to latency added by baseline processing on the client and server. Different games may establish different latency standards. Further, different game features may have different latency tolerance.

Embodiments of the present invention may make a contextual determination of what constitutes a rich data stream for a particular game, under particular circumstances. Each game may have a roundtrip latency-sensitivity rating. The roundtrip latency-sensitive rating may be determined from user feedback collected from test groups, or through another method, and associated with the game. The latency sensitivity rating may be different for different game features or the same for the entire game. For example, avatar movement may be given a different sensitivity rating than background movement.

The rich or basic classification for each input stream may be determined by identifying the latency sensitivity rating for the present game, determining available bandwidth, and determining client and server processing capabilities. The various factors may be combined to determine latency created for the control stream. If it is less than the latency sensitivity rating then the control stream is basic, if greater than the latency sensitivity rating then rich.

In an embodiment, the latency associated with a control stream is determined experimentally using a test control input and test game response. The measured latency is used to determine whether the control is basic or rich.

When the control is determined to be rich via experimentation or calculation, then client-side preprocessing of the control stream may be used. Various preprocessing methods are described in more detail subsequently. If the control is basic, then it is uploaded without being transformed to a reduced control input, but it may still be processed according to various transport protocols and other processing involved in communicating the control signal to the server. This other processing occurs to both pre-processed and unprocessed control signals.

When certain features are latency sensitive, then those features may be rendered on the client and combined with rendered images received from the server. A feature may be latency sensitive regardless of the control input. For example, avatar movement may be latency sensitive regardless of the whether the avatar is controlled using a depth camera or joystick.

The tablet 232 can be both a game controller and a game client. Tablet 232 is shown coupled directly to the game console 210, but the connection could be indirect through the Internet or a subnet. In one embodiment, the game service 230 helps make a connection between the tablet 232 and the game console. The game service 230 may associate devices when the devices log in using the same identification or identification codes that are linked. Users may also ask that devices be linked through the game service 230 for use as input or companion devices. The tablet 232 is capable of generating numerous control streams and may also serve as a display output mechanism. In addition to being a primary display, the tablet 232 could provide supplemental game information different from, but related to information shown on a primary display coupled to the game console 210, or simply be a control surface. The input streams generated by the tablet 232 include video and picture data, audio data, movement data, touch screen data, and keyboard input data.

The depth camera 234 generates three-dimensional image data used as a control input. The depth camera 234 may use infrared camera to determine a depth, or distance from the camera for each pixel captured. Stereoscopic depth cameras are also possible. In addition, the depth camera 234 may capture a color video stream or picture. The depth camera 234 may have several image gathering components. For example, the depth camera 234 may have multiple cameras. The depth camera 234 may be used to create user interface though which the user makes gestures and speaks audio commands to control game. The user may have no other controller. In other embodiments, the depth camera 234 may be used in combination with other control input.

The headset 236, captures audio input from a player and the player's surroundings and may also act as an output device if it is coupled with a headphone or other speaker.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

Exemplary Game Client and Game Service for Remote Gaming

Figure 3:
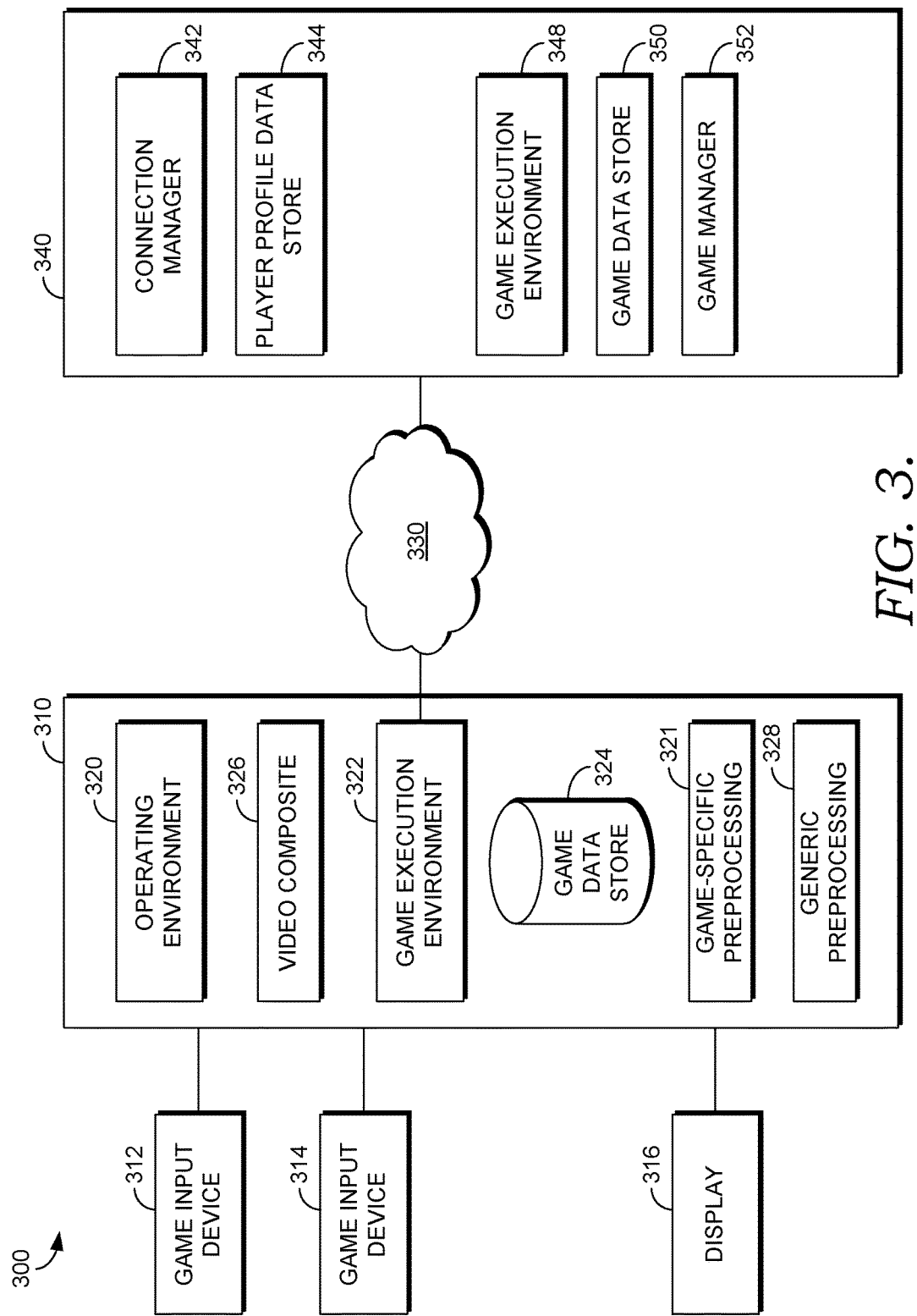
FIG. 3 is a diagram of a remote gaming computing environment, in accordance with an embodiment of the present invention.

Turning now to FIG. 3, a remote gaming environment 300 is shown, in accordance with an embodiment of the present invention. The gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, movement aware devices (e.g., accelerometer and/or gyroscope equipped devices), a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, a game data store 324, a game-specific preprocessing component 326, and a generic pre-processing component 328.

The operating environment 320 may be provided by an operating system that manages the hardware and provides services to application running on the game client 310. The operating environment may allocate client resources to different applications as part of the pre-processing and other functions.

The game data store 324 stores downloaded games and partially downloaded games. Games may be downloaded in playable blocks. To play a game, the game may need to be loaded from the game data store 324 into active memory associated with the game execution environment 322. The game data store 324 may also store player progress files.

The game-specific preprocessing component 326 processes a rich controller input to generate a reduced controller input. The reduced controller input can take many forms and can vary depending on the type of rich controller input involved.

When the rich control input is three-dimensional image data, the reduced controller input generated by the client may take the form of skeletal tracking data, a reduction to surfaces, a reduction to geometry, deltas, compressed imagery, and a reduction to bounding boxes. Each of these will be described in more detail subsequently, but they all result in control data comprising less data to communicate to the controller. The reduced controller input is communicated over network 330 to the game execution environment 348 on the game server 340. The reduced controller input is used as an input that controls the game in progress.

The game-specific preprocessing 326 is specific to the particular game being executed. While the steps may be similar to the generic preprocessing described subsequently, a part of the game-specific processing is specific to a particular game. The code may be game specific to generate an output in a form that is consumable to the particular game. In other words, game specific code may be used to generate a compatible control signal. In other cases, the game specific code does something unique that other games do not do.

In one embodiment, the game-specific preprocessing generates a control input that is specific to the game. For example, a hand gesture could be interpreted to mean move the avatar right or to pick up an object in a first game, but something different in a second game. In this case, the reduced controller input would simply be a movement command instead of the three-dimensional image data. Interpreting three-dimensional image data to recognize a gesture and form a movement command is a transformation of one type of input data (depth data) to a second type (movement). Taking this one-step further, the movement data or depth data could be converted to a control command, such as "throw ball" or "pause game." This is described as transformation to control. In other embodiments, relevant control data is separated from irrelevant control data, but does not change form. For example, reduced controller input could be a portion of the three-dimensional image around an object of interest, such as a player's face or hand, without the rest of the three-dimensional image data. Isolating a portion of image data (3D or 2D) is described as a reduction to a bounding box. In the game-specific preprocessing of audio commands, the reduced controller input could be a unique game command or a common game command described in a game specific way, such as use of game specific slang.

In one embodiment, the game-specific preprocessing component 326 is extracted or based on a video game originally written to be processed entirely on the client side. In this manner, the part of the video game that processes the rich controller inputs is separated and put on the client side and the commands for other game functions are sent up to the execution part of the game, which resides on the server 340. In this case, there may be a need to reconcile data that would have otherwise been processed instantaneously within the game execution environment on a client. The signal reconciliation component 346, explained in more detail subsequently, may perform this reconciliation.

The generic preprocessing 328 preprocesses the rich data input in a way that is applicable to or consumable by multiple games. The reduced controller input generated by the generic preprocessing component 328 is communicated over network 330 to the game execution environment 348 where it may be used to manipulate the game in progress. The examples of generic preprocessing steps include skeletal tracking, deltas, reduction to services, reduction to geometry, reduction to bounding boxes, and three-dimensional image compression. When the rich data input includes audio signals the generic processing could be a speech-to-text translation. For example, the user could speak the word "pause" and the generic preprocessing could send a command to pause the game.

The game execution environment 322 comprises the gaming resources on the client 310 uses to execute instances of a game or part of a game. In some embodiments, the client 310 does not include a game execution embodiment or the computing resources to execute the full game. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to a display device.

In other embodiments, the game execution environment 322 includes code related to character interactions. In one embodiment, only latency-sensitive character interaction game features are rendered on the client. Latency-sensitive features of a game may be designated by a game developer and may also be dynamically determined. In one embodiment, the game server 340 communicates game code needed to execute only the latency-sensitive interaction features. The execution environment 322 may not have resources or the code to execute the entire game. The game execution environment 322 may execute part of a game to generate game images that are combined by the video composite component 326 with rendered images received from the game server 340.

Game interactions, and latency sensitive game interactions, may take multiple forms including targeting, delivery, and contact. In all forms of interaction, a character may be the subject or object of the interaction or a combination of both. For example, a character could throw balls at other characters and be hit by balls thrown by others. Different games use different onscreen manifestations for targeting, delivery, and contact. In some games, a manifestation may be displayed indicating the character is being targeted by others. This manifestation may be client rendered as part of a character interaction with a game object, even though the character is the object of the interaction rather than the performer.

Targeting interactions involve a first character targeting a game object, such as a second character or ball. As used throughout, the first character is the character controlled by a user associated with the client device on which the first character's interactions are processed and rendered. In racing games, steering may be an example targeting and client rendered. For example, a car or part of a car may be rendered by the client and move according to steering commands In a first person racing game where the car is not visible, the immediate foreground in front of the car may be client rendered in response to the steering input. Targeting may be a preliminary step, but it is not required in all games.

In addition to targeting, game interactions include delivery of the game object that has been targeted. For example, a bullet being fired from a gun or a ball being kicked are both examples of a delivery interaction. In the shooting example, the muzzle flash, audible sounds associated with firing, and a tracer or other indication of bullet trajectory may be rendered on the client and combined with images rendered by a server to depict the delivery interaction.

A third class of game interaction is contact detection. Broadly, contact detection indicates whether a game object contacted an intended target or any target. For example, if a character was shooting at another character, the contact detection would indicate that the character hit the intended target. Manifestations of the hit may be rendered on the client device.

Other types of game interactions may be rendered on the client device and combined with video game images rendered by the server to produce a video game experience for a user. In one embodiment, a character's interaction with game objects are the only features processed on the client and rendered on the client. In a remote multiplayer setting where other players are connected via a network and are not in the same geographic location or play space, the other character's images are rendered on the server.

The video composite component 326 merges rendered video game images received from the game server 340 with rendered video game images rendered by the client 310 to form a single image that is output to display 316. The video composite component may perform scaling and other functions to generate a video output that is appropriate.

The game server 340 comprises a connection manager 342, a player profile data store 344, a signal reconciliation component 346, a game execution environment 348, a game data store 350, and a game manager 352. Though depicted as a single box, the game server 340 could be a server farm that comprises numerous machines, or even several server farms.

The connection manager 342 builds a connection between the client 310 and the server 340. The connection manager 342 may also provide various authentication mechanisms to make sure that the user is authorized to access the game service provided by the server 340. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service.

The game execution environment 348 comprises the gaming resources on the game server 340 uses to execute instances of a game or part of a game. The game execution environment 348 comprises active memory along with computing and video processing. The game execution environment 348 receives control signals from the game client 310 and causes the game to be manipulated and progress according to its programming In one embodiment, the game execution environment 348 outputs a rendered video stream that is communicated to the game client. In other embodiments, the game execution environment 322 outputs game geometry, depth buffer data, or other representations, which may be combined with local objects on the gaming client to render the gaming video. The game execution environment 322 may execute part of a game to generate game images that are communicated to the game client 310 for combination with rendered images generated by the game client 310.

Figure 4:
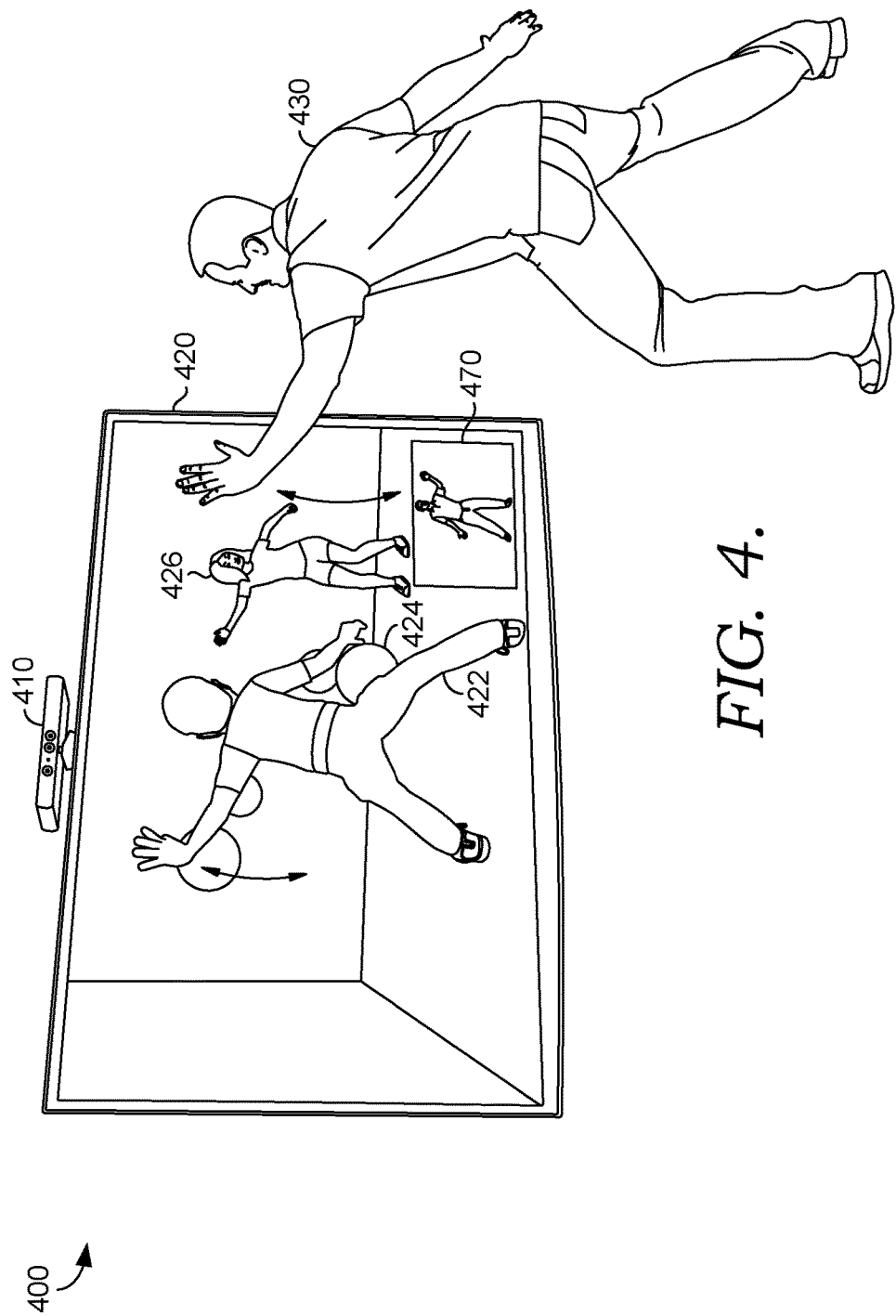
FIG. 4 is a diagram of a gaming interface, in accordance with an embodiment of the present invention.

Turning now to FIG. 4, an exemplary interface is shown, in accordance with an embodiment of the present invention. The depth camera 410 has a view of the player 430. Embodiments of the present invention are not limited to games using a depth camera as a game controller. A depth camera 410 generates three-dimensional image data that is able to capture the player's 430 movement. In this case, the player 430 is moving his left arm up and down. A game console or game server receives the input from the depth camera 410 and uses it to manipulate the avatar 422 shown on display 420. As can be seen, the movements of the avatar 422 interact with virtual objects 424 and a second player 426. A different person connected to the same game session through the game server may control the second player 426. The virtual objects 424 are balls. The user's movements are able to form a control input when captured by the depth camera 410.

FIG. 4 also includes a picture-in-picture ("PIP") image 470 of the player 430. This may be a standard video image captured by the depth camera 410 or some other camera. The PIP image may be rendered on the client without sending the image to the game server because PIP may be latency sensitive.

Figure 5:
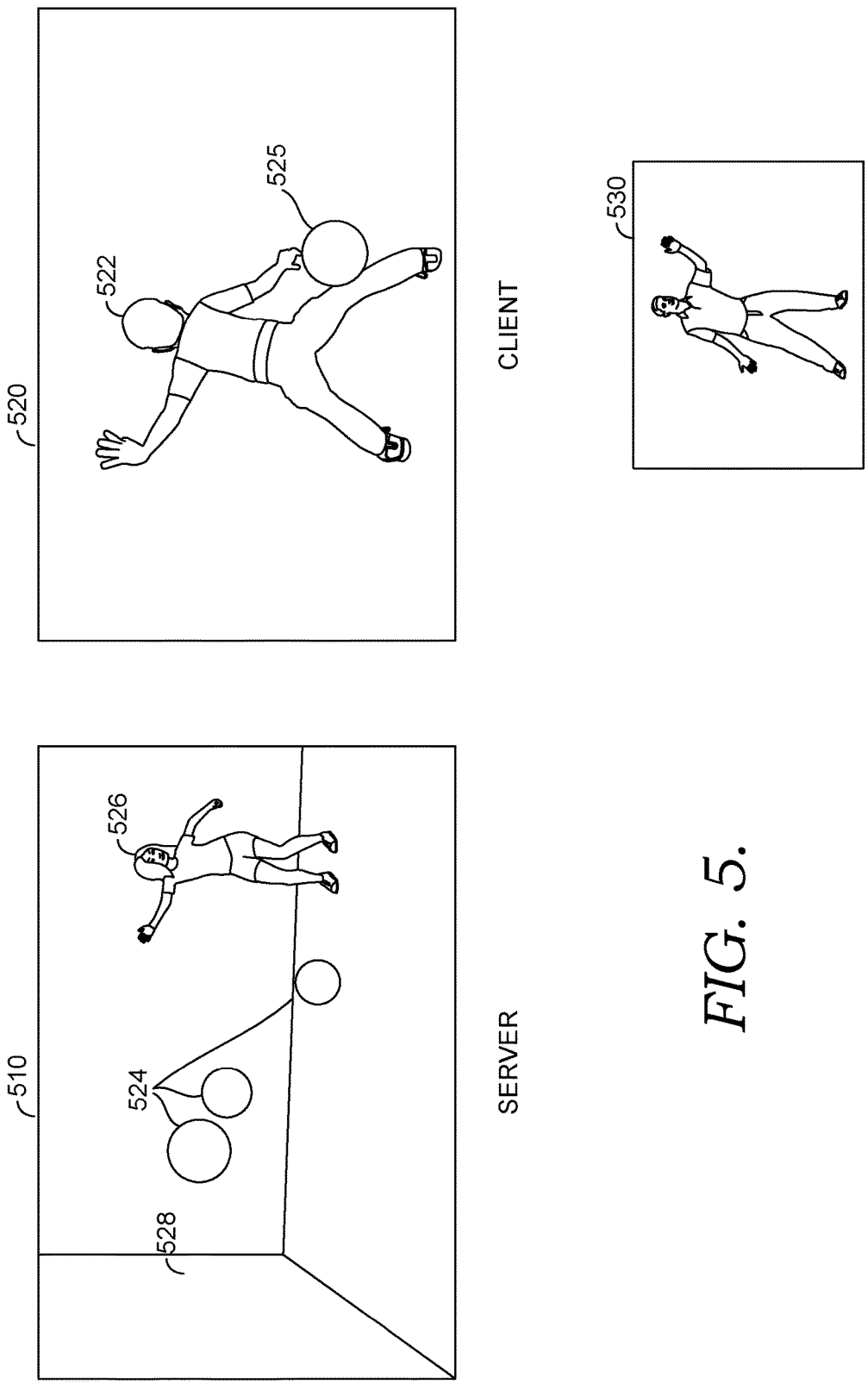
FIG. 5 is diagram illustrating compositing three rendered images, in accordance with an embodiment of the present invention.

Turning now to FIG. 5, three rendered images are illustrated, in accordance with an embodiment of the present invention. The rendered images include server-rendered image 510, client-rendered avatar 520, and client-rendered picture-in-picture 530. These three rendered images are composited to form the image shown previously in FIG. 4. The rendered images generated by the server may also be sent with depth buffer data in addition to colored image data. The depth buffer data is used to order the client-rendered images and the server-rendered images during the composite process. For example, the client may render an avatar that is partially obscured by an object rendered by a server when the images are composited. The depth data is used to composite the images in the correct depth order. The server-rendered image 510 includes both foreground and background images that are not part of player interactions with game objects in the illustrated game. The server-rendered image 510 includes the background area 528, virtual game objects 524, and remote player avatar 526. Virtual game objects 524 are manipulated based on actions taken by the player locally and the second player remotely. As mentioned previously, both players are participating in the same game using different input devices and different game clients. The game is being executed in a remote server's game execution environment.

The avatar 522 is rendered by the client along with ball 525. The ball 525 is rendered by the client because it is being delivered in response to an interaction with avatar 522. The avatar 522 is client rendered because its movements directly affect interactions with the game objects, such as the ball 525. In this illustration, the other virtual objects 524 are server rendered because their movement is not the immediate result of an interaction with the avatar 522.

The avatar 522, ball 525, and the virtual objects 524 are all manipulated as a result of control input received at the client. At least part of the control input is sent to the server and at least part of the control input is consumed by the client. In one embodiment, the entire control input is sent to the server and the entire control input is consumed by the client, but only to execute and render designated game features.

The picture-in-picture 530 is also rendered by the client. In one embodiment, the video image is not communicated to the server along with the other controller input. If the video image is communicated to the server, it is also consumed by the client to generate the PIP image. As mentioned, the three rendered images are composited to form a single video game image that is output to the user.

Figure 6:
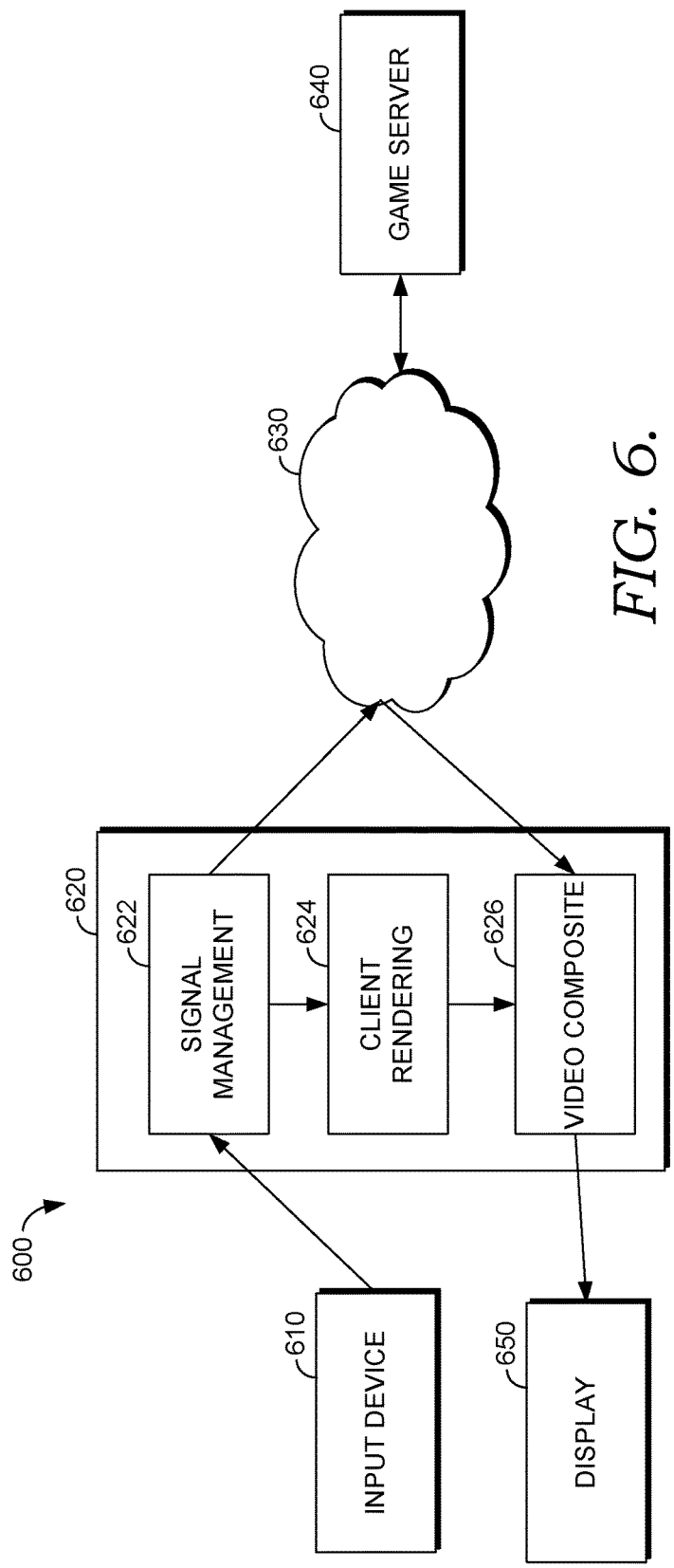
FIG. 6 is a diagram illustrating data flow through a split rendering process, in accordance with an embodiment of the present invention.

Turning now to FIG. 6, data flow through a possible embodiment of the present invention is illustrated. The remote gaming environment 600 includes an input device 610, a game client 620, a network 630, a game server 640, and a display 650. The input device 610 generates a rich data signal, such as a three-dimensional image or video data. Other examples of rich data streams have been described previously. The game client 620 may be a game console or other computing device. Network 630 may be similar to network 330 described previously and may include the Internet. Game server 640 may be similar to game server 340 described previously.

Game server 640 executes a video game that has been manipulated in response to control signals received from the game client 620. The display 650 may be a television, monitor, or other display integrated into a computing device such as a slate or smart phone. In embodiments of the invention, the display 650 may be integrated into the game client 620. For example, the game client 620 may be a slate or laptop computer that has an integrated display. The input device 610 may also be integrated into the game client 620 in some embodiments of the present invention. For example, a game client could have a depth camera integrated into the body of the game client 620.

Initially, the input device 610 generates a control signal that is sent to a signal management component 622 on the game client 620. The control signal may be generated by a game pad or other game controller. The signal management component 622 directs all, or portions, of the control signal to the appropriate destinations. The signal management component 622 may also perform various preprocessing on the data signal to prepare it for consumption by the client rendering component 624 or the game server 640.

The signal management component 622 sends at least part of the signal, preprocessed or otherwise, through network 630 to the game server 640. The game server 640 consumes the signal to manipulate an ongoing game session and to render a video game image. Roughly simultaneously, the signal management component 622 communicates at least part of the control signal to the client rendering component 624. For the sake of simplicity, the client rendering component 624 is indicated as a single component. However, the client rendering component 624 may be part of a game execution environment or be related to other components not shown that execute part of the game in response to the signal and determine what image to render.

The client rendering component 624 generates a client-rendered video game image that is different from the server-rendered video game image generated based on the same or similar signals. Generally, the client rendering component 624 generates images of a particular game feature related to a player's interactions with a game object In order to render the image, at least part of the video game may be executable on the client 620. Further, the client may need environmental geometry describing the playing environment to a player in order to calculate appropriate movements. For example, the game client 620 would need to know the player is standing in front of a wall, and not move the player forward in response to a move forward instruction. The player may similarly navigate around objects and fall, leap, or perform other actions depending on environmental conditions. The code on the game client 620 determines player movements that are appropriate for the environmental conditions including other player locations and game factors such as player power level. For example, an instruction to jump would not be followed by the client if the present game state indicated the player lacked the present ability to jump.

The game server 640 may periodically send game state information to the client 620 for use in the client-side game code. The game state information may include environmental geometry describing land, objects, and other players. In one embodiment, the client does not track the overall game progress, game points, scores, etc. For example, the game client 620 may render a game character moving the left arm to hit a ball, but not be aware whether the resulting ball movement scored a point. The client may ultimately output a composite image showing the arm hitting the ball, but the game code may not know other game information beyond what is needed to render the character's changes or other features related to the interaction.

The rendered video game image from the game server 640 and the client rendering component 624 are both received by the video composite component 626. The video composite component forms a single video game image that is output to the display 650. The composite component may use depth buffer information received from the game server to generate the composite image.

Figure 7:
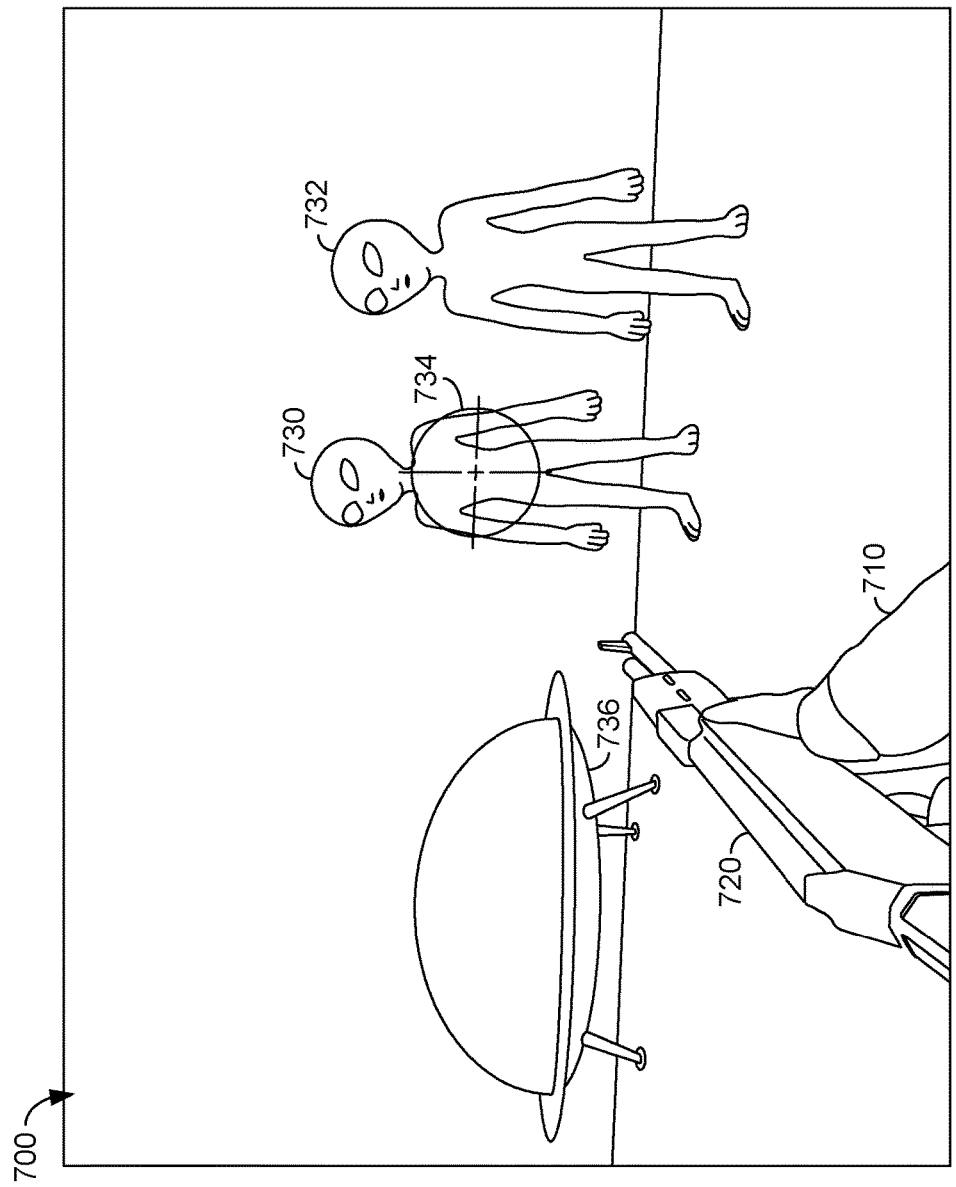
FIG. 7 is a diagram illustrating game interactions in a first-person shooter environment, in accordance with an embodiment of the present invention.

Turning now to FIG. 7, targeting within a first person shooter game is illustrated, in accordance with an embodiment of the present invention. As mentioned, targeting is one form of game interaction that may be rendered on a client device and combined with video game images rendered on a server to form a composited video game image. In this case, the scene 700 depicts a character's arm 710 holding a rifle 720. As indicated by the reticle 734, the rifle is pointed at the alien 730. A nearby alien 732 looks on.

In the example shown, the character's arm 710, the rifle 720, and the reticle 734 could all be part of the character's targeting interaction with the game object. In this case, the game object is the alien 730. In one embodiment, all game features related to the targeting are rendered on the client and combined with the spaceship 736, aliens 730, 732, and all other scene images not related to the character's targeting interactions generated by a game server.

In one embodiment, depicting game interaction manifestations may require that the client understand the arrangement of objects within the scene 700. For example, an object that is targeted may turn red or otherwise indicate that the targeting is accurate. The targeting may be processed on the client based on user movements without direct input from the server with reference to the targeting process. Game code related to targeting would reside on the client.

Figure 8:
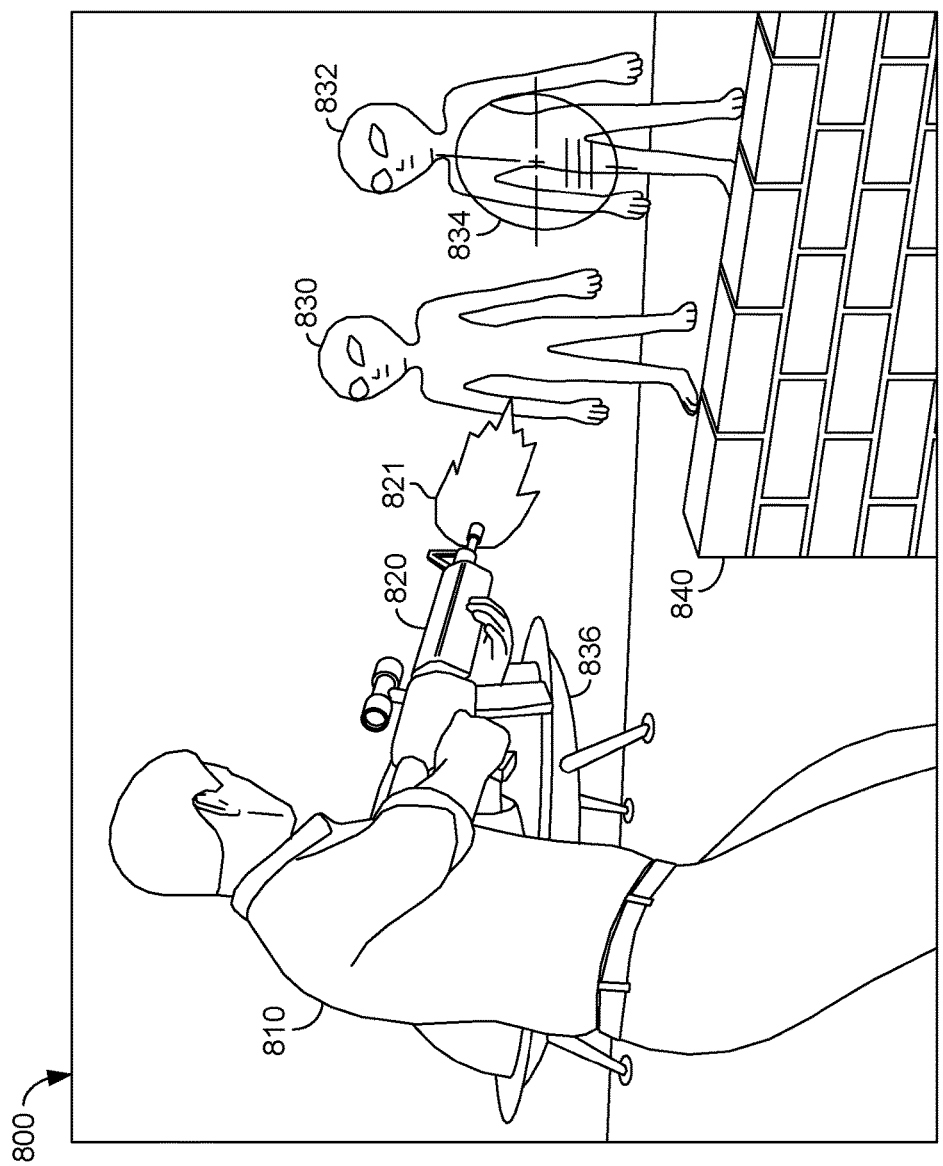
FIG. 8 is a diagram illustrating game interactions in a third-person shooter environment, in accordance with an embodiment of the present invention.

Turning now to FIG. 8, a delivery interaction within a third-person shooting environment is illustrated, in accordance with an embodiment of the present invention. A third-person shooting environment shows most of the character 810 controlled by the user of the client device. In this case, the character 810 is holding a rifle 820 that is pointed at alien 832, while alien 830 looks on. The spaceship 836 and brick wall 840 are also visible.

The reticle 834 and muzzle flash 821 are related to the delivery interaction. In this case, a bullet or output from the rifle 820 is delivered to the alien 832. Note that the reticle 834 may be part of a targeting and a delivery action. If the reticle 834 continues to be displayed during a delivery interaction, then it may also be considered part of the delivery interaction game features. Thus, game features may take part in different types of interactions.

In the case shown, the muzzle flash 821 and the reticle 834 may be client rendered as part of the game interaction. In addition to the visible manifestations, the client could generate audible manifestations of character interactions. For example, the client could generate shooting noises that are combined with audible signals received from the client. In one embodiment, all audio is client generated using game code. The game code may generate in the audio signals in response to state information received from the server.

In scene 800, the game character 810 and rifle 820 may be server rendered. In another embodiment, the game character 810 and/or rifle 820 may also be rendered on the client as part of the game interaction features. The alien 830, and 832 are server rendered along with the brick wall 840 and spaceship 836. Though not depicted, a hit manifestation on the alien 832 may be client rendered as part of the contact interaction feature. For example, the green alien 832 could turn red upon being hit. In another embodiment, the portion of the alien 832 hit turns red.

Both the targeting, delivery, and hit detection (or contact), which is not directly depicted in FIG. 8, may require the game code running on the game client to be able to ascertain the location of objects depicted within the scene and calculate a trajectory of an object delivered as part of the game interaction. In one embodiment, geometric shapes are used to calculate a game object's location in the scene. The geometric shapes may be downloaded or communicated from the server to the game client as game state information changes.

Figure 9:
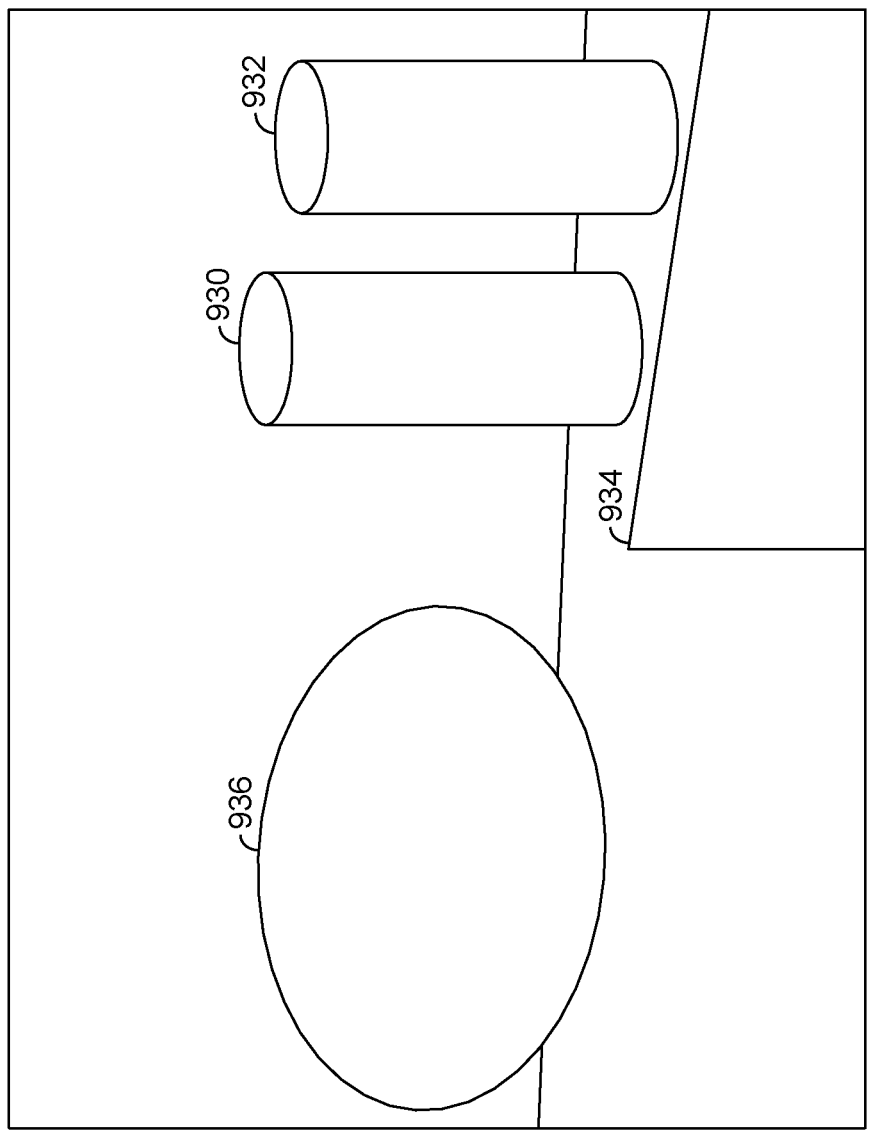
FIG. 9 is a diagram illustrating game objects depicted as geometric objects for the purpose of analyzing game interactions, in accordance with an embodiment of the present invention.

Turning now to FIG. 9, the depiction of game objects as geometric shapes is shown, in accordance with an embodiment of the present invention. The shapes are depicted in FIG. 9 for the sake of illustration. In reality, the shapes need not be rendered visually as any part of the game interaction process. Rather, the game objects' size, shape, and location may be consumed internally for the purpose of performing calculations involving the game interactions. The calculations may involve targeting, delivery of a projectile and hit detection.

As can be seen, the objects correspond with those shown in FIG. 8. The spaceship 836 is depicted as an oblong spheroid 936. The aliens are depicted as cylinders 930 and 932. The wall 840 is depicted as a plane 934. In one embodiment, only the front surface of the wall 840 is presented within the geometric shape data. The front surface of the wall 840 may be necessary to make sure that the game character does not walk through or shoot through or target through the wall. Similarly, a projectile would bounce off a wall rather than hit an object if the projectile was aimed at the wall.

Thus, the game code on the client device may be capable of both rendering manifestations of game interactions as well as performing calculations related to these interactions within the video game. As mentioned, these may be preliminary calculations that are duplicated on the game server. In one embodiment, the targeting information is not communicated to the game server, but entirely performed on the client. Upon receiving a control input to deliver an object toward the target, the control input is uploaded to the server, which performs a trajectory calculation in addition to a preliminary trajectory calculation performed on the client.

A preliminary hit manifestation may be generated on the client along with manifestations of the delivery such as the muzzle flash illustrated previously. For purposes of a multiplayer game, the ultimate hit calculation may reside with the server. The control input has a time code that is used to compare with the exact location of an object at the point in the game when the control was issued. Further, the server may use more sophisticated targeting processes that do not rely on the geometric shapes, but use shapes that more closely resemble the game object.

Figure 10:
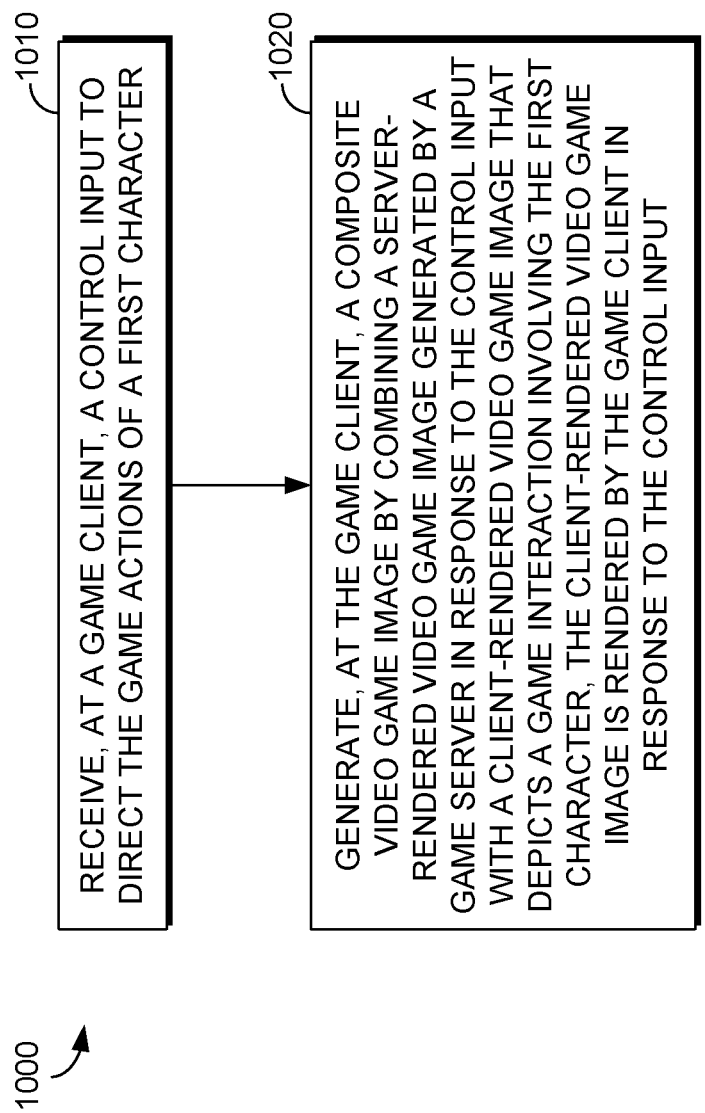
FIG. 10 is a flow chart showing a method of enabling a video game comprising player interactions within a remote gaming environment, in accordance with an embodiment of the present invention.

Turning now to FIG. 10, a method 1000 of enabling a video game comprising player interactions within a remote gaming environment is shown, in accordance with an embodiment of the present invention. The server-based gaming environment may be similar to the remote gaming environment described previously with reference to FIG. 3. In general, a game client receives control input locally and communicates all or part of this information to a game server that executes the game and generates a video game image.

At step 1010, control input is received at the game client to control a first character within a video game. The input may be generated by a depth camera, game pad, joystick, or keyboard. The control input may be speech data received by a microphone or movement data captured by an accelerometer or gyroscope equipped device. The input device used to generate the control signal may be integrated into the game client, such as a camera or microphone integrated into a slate or personal computer. The input device may be located nearby and communicatively coupled to the game client via a wired or wireless connection. Received by the game client does not need to mean the input is received from an external device. Received by the game client could mean generated by the game client and received by a component on the game client, such as signal management component 622 or client rendering component 624, described previously, or a combination of components within a game execution environment that handles game function on the game client.

At step 1020, an integrated video game image is generated at the client by combining rendered video game images generated in response to the control input that are received from a game server with video game images rendered by the game client in response to the control input. The client-rendered image depicts a game interaction involving the first character. Thus, a single video game image is created by combining a video game image rendered by the game server with a video game image rendered by the game client. The images rendered by the game server and those rendered by the game client are different. In one embodiment, the two images do not have features in common. For example, the first character may only be present in the client-rendered video game image and is not present in the server-rendered image. Other game features related to targeting, delivery, contact or other game features related to an interaction may also be client rendered. Similarly, game objects or a second player may be rendered in the server-generated image and not be present in the client-rendered image.

Game interactions may take multiple forms including targeting, delivery, and contact. In all forms of interaction, a character may be the subject or object of the interaction or a combination of both. For example, a character could throw balls at other characters and be hit by balls thrown by others. Different games use different onscreen manifestations for targeting, delivery, and contact. In some games, a manifestation may be displayed indicating the character is being targeted by others. This manifestation may be client rendered as part of a character interaction with a game object, even though the character is the object of the interaction rather than the performer.

In addition to rendering manifestations related to the interactions on the client, the truth of the game interactions may also be determined on the client in some embodiments. For example, the truth of whether or not a projectile hits its intended target may be determined on the client and communicated to the game server, which in turn updates game state information across all characters and devices connected to the game session. In another embodiment, the truth of a contact is determined by the server and communicated to all devices as appropriate. The client-hit determination may be preliminary and used for the purpose of generating an immediate manifestation rather than changing the game score or resulting in a multiplayer setting.

Targeting interactions involve a first character targeting a game object, such as a second character or ball. As used throughout, the first character is the character controlled by a user associated with the client device on which the first character's interactions are processed and rendered. In an action game involving shooting a gun, images associated with targeting may include a gun lining up with the target and a reticle moving over a targeted object. A sports game may involve directing an anticipated sports action toward a game object, such as another character or a ball. For example, in a golf game, the target arrow may be moved over a golf ball and strength of swing information input. Additionally, the user may be able to select a club as part of targeting; such clubs may then be rendered on the client along with dials, bar graphs, color indications or other game features that communicate a selected strength of swing. All of these targeting actions toward the golf ball may be processed on the client and manifestations that are consistent with the targeting data may be rendered on the client. The rest of the scene may be rendered on the game server and communicated to the client for compositing. Z-buffer data and other information needed to correctly composite the images may also be provided by the game server.

In a multiplayer game such as soccer or football where a user can choose to play different characters on a team at different times, targeting may involve a selection method allowing the user to select an individual character to play. Targeting may include manifesting an aiming guide, which helps to show which way a ball will be kicked or thrown based on current input or game state.

In a baseball game, targeting could involve swing strength, timing, and placement. All of these could be manifested by character movements that are rendered on the client. The character movements could include movements of a bat or other game object. Targeting may be a preliminary step, but it is not required in all games.

In addition to targeting, game interactions include delivery of the game object that has been targeted. For example, a bullet being fired from a gun or a ball being kicked are both examples of a delivery interaction. In the shooting example, the muzzle flash, audible sounds associated with firing, and a tracer or other indication of bullet trajectory may be rendered on the client and combined with images rendered by a server to depict the delivery interaction.

Similarly, a ball's movement in response to being kicked or thrown may be depicted on the client. The ball's trajectory may also be calculated by the client. Where appropriate, the client rendering may include a depiction of the character. For example, when the delivery interaction is kicking a ball, the character may be client rendered and shown kicking the ball. In a third person shooter game, the character being controlled by the user of the client device may be client rendered in conjunction with the character interactions.

The third class of game interaction is contact detection. Broadly, contact detection indicates whether a game object contacted an intended target or any target. For example, if a character was shooting at another character, the contact detection would indicate that the character hit the intended target. Manifestations of the hit may be rendered on the client device.

In one embodiment, the hit detection is also performed on the server. On the client, the hit detection may be performed using geometry representing game objects. The geometry may be received from the server as the game state changes. The game geometry may represent different game objects using geometric shapes. For example, other characters may be represented using cylinders. The client performs a hit detection to determine whether or not an indication of a contact or hit should be rendered and displayed. In one embodiment, the client hit detection is a preliminary detection and may be overridden by a server determination that is better able to synchronize multicharacter movement and locations. In this case, the hit information or shot information may be communicated with a time stamp that is compared against another game object's location on the server.

Other types of game interactions may also be rendered on the client device and combined with video game images rendered by the server to produce a video game experience for a user. In one embodiment, a character's interaction with game objects are the only features processed on the client and rendered on the client. In a remote multiplayer setting where other users are connected via a network and are not in the same geographic location or play space, then the other user's characters are rendered on the server.

Figure 11:
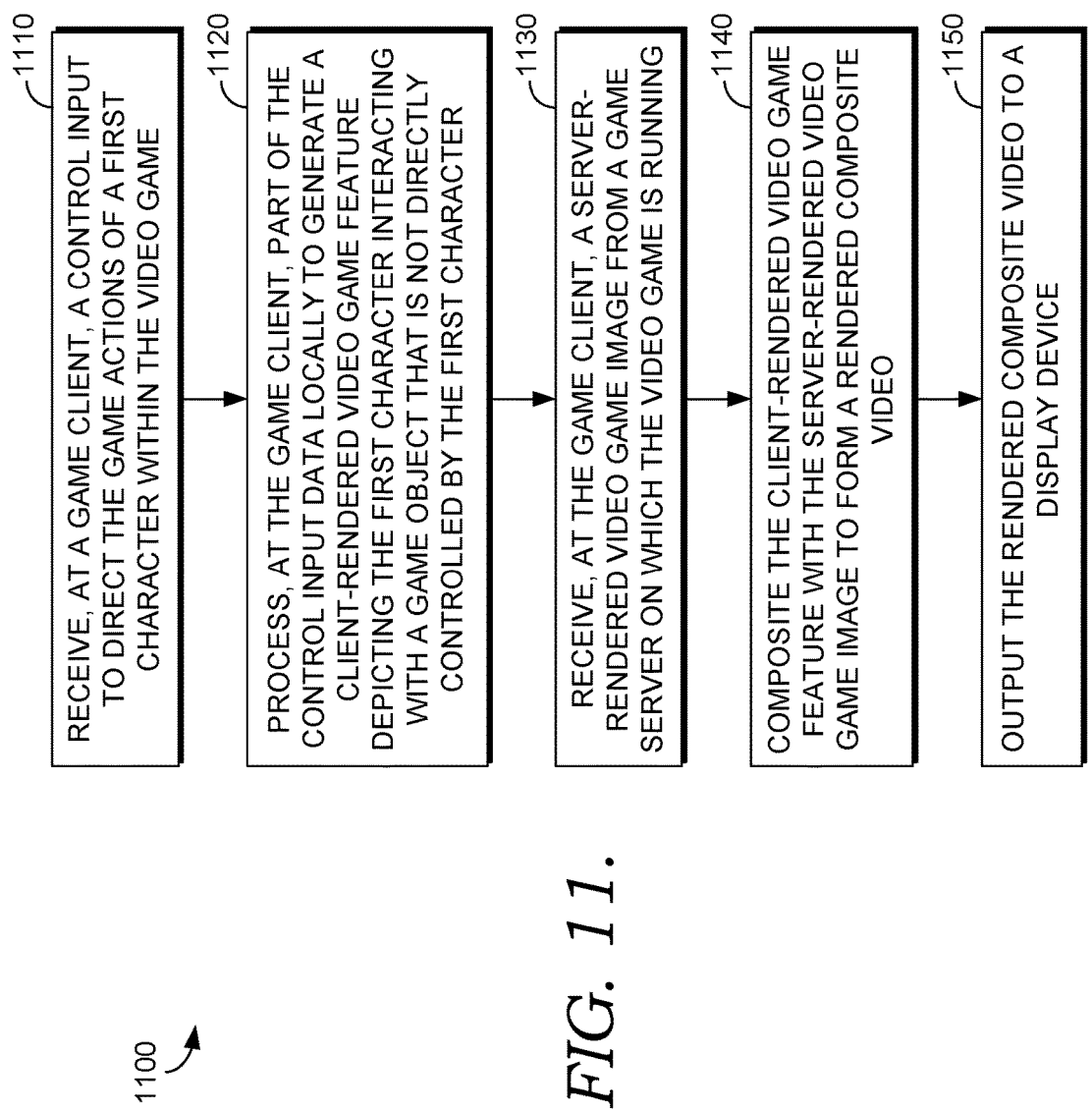
FIG. 11 is a flow chart showing a method of enabling a video game comprising player interactions within a remote gaming environment, in accordance with an embodiment of the present invention.

Turning now to FIG. 11, a method 1100 for enabling a video game comprising character interactions within a remote gaming environment is shown, in accordance with an embodiment of the present invention. Method 1100 may be executed in a remote gaming environment similar to the one described previously with reference to FIG. 3.

At step 1110, control input to control a first game character is received at a game client. Received by the game client does not need to mean the input is received from an external device. Received by the game client could mean generated by the game client and received by a component on the game client, such as signal management component 622 or client rendering component 624, described previously, or a combination of components within a game execution environment that handles game function on the game client.

At step 1120, part of the control input is processed locally at the game client to generate a rendered video game feature depicting the first character interacting with a game object that is not directly controlled by the first character. The processing may be done using game specific code running on the game client. Game specific code is code associated with the game running on a game server that is not capable of executing an entire game but is capable of generating certain images that is combinable with an image of the overall game being executed at a game server.

At step 1130, a rendered video game image is received at the game client from a game server on which the video game is running. At step 1140, the rendered video game feature is composited with the rendered video game image to form a final rendered video. At step 1150, the rendered video is output to a display device.

Figure 12:
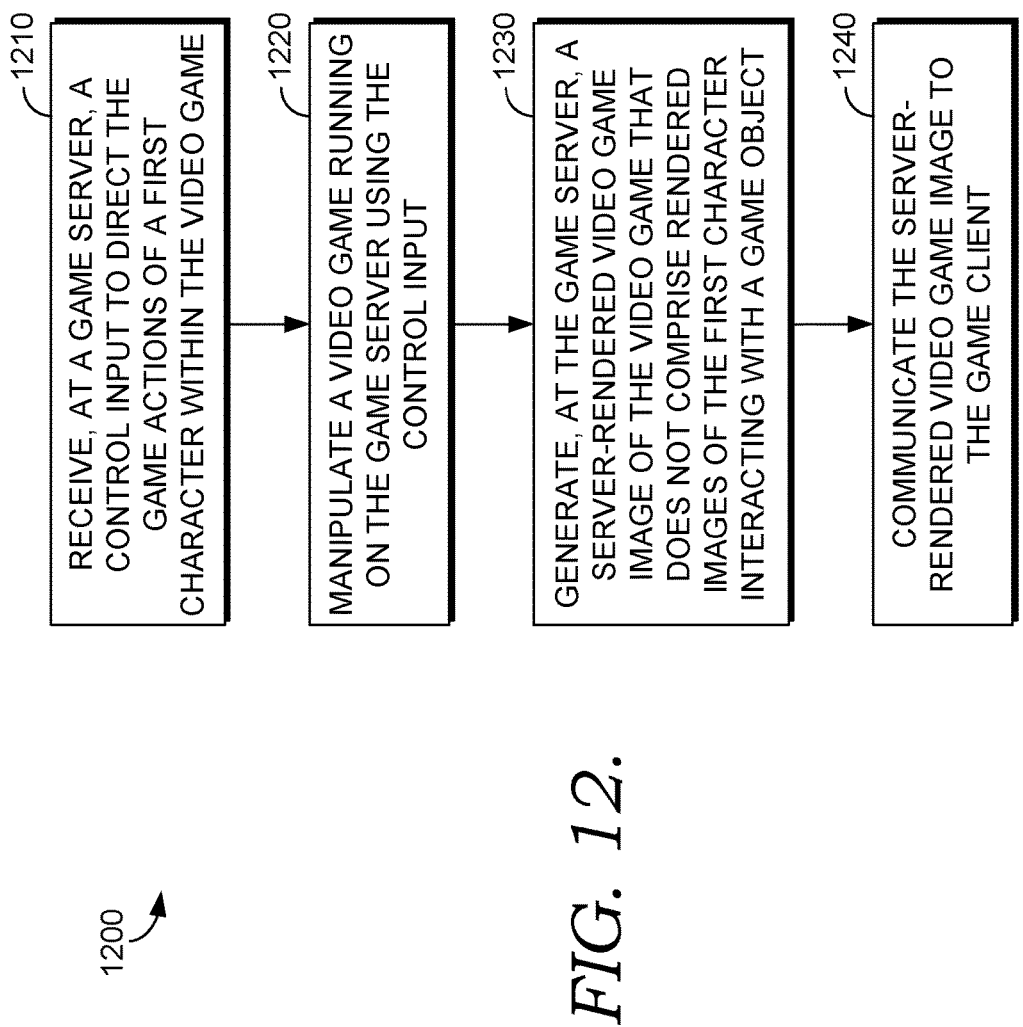
FIG. 12 is a flow chart showing a method of enabling a video game comprising player interactions within a remote gaming environment, in accordance with an embodiment of the present invention.

Turning now to FIG. 12, a method 1200 for enabling a video game comprising character interactions within a remote gaming environment is shown, in accordance with an embodiment of the present invention. Method 1200 may be executed in a remote gaming environment similar to the one described previously with reference to FIG. 3.

At step 1210, control data to direct the game actions of a first character within the video game is received at a game server. "Received" by the game client does not need to mean the input is received from an external device. Received by the game client could mean generated by the game client and received by a component on the game client, such as signal management component 622 or client rendering component 624, described previously, or a combination of components within a game execution environment that handles game function on the game client.

At step 1220, game state information is updated based on an interpretation of the control data. At step 1230, part of the three-dimensional image data is processed at the game server to generate a server-rendered video game image. The server-rendered video game image is not a complete image of the video game and does not include one or more game features depicting a character's interaction with a game object. One or more game features are rendered by the game client and combined with the server-rendered video game image to generate a video game image shown to a user.

At step 1240, a server-rendered video game image is communicated to the game client from a game server on which the video game is running.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A game client comprising:
  a processor;
   computer-storage memory having computer-executable instructions embodied thereon that when executed configure the computing device to:
    receive a first control input to direct game actions of a first character in a video game, the game actions comprising a first game interaction with a specific game object;
    receive a second control input to direct game actions of a second character in the video game, the game actions comprising a second game interaction with the specific game object;
    communicate the first and second control inputs to a game server over a network;
    receive, through the network, a server-rendered video game image generated by a game server in response to the first and second control inputs, wherein the server-rendered video game image comprises the specific game object;
    receive from the game server geometry data that describes a size and shape of game objects using geometric shapes, the game objects being depicted in the server-rendered video game image comprising the specific game object;
    determine that the game interaction between the first character and the specific game object has occurred using the geometry data to calculate a location of the specific game object;
    determine that the game interaction between the second character and the specific game object has occurred using the geometry data to calculate a location of the specific game object;
    generate a client-rendered video game image including a visible indication that game interaction between the first and second characters and the specific game object has occurred wherein the client-rendered video game image is rendered by the game client in response to the first and second control inputs;
    generate, at the game client, a composite video game image by combining the server-rendered video game image with the client-rendered video game image; and
    output the composite video game image for display.

2. The game client of claim 1, wherein the game client only renders game features depicting game interactions involving the first character or the second character and the server-rendered video game image depicts all other game features.

3. The game client of claim 1, wherein the game interaction is a visible or audible indication that the first character hit the specific game object with a game object.

4. The game client of claim 1, wherein the game interaction is movement of a game object in response to an action taken by the first character.

5. The game client of claim 1, wherein the game interaction is the first character targeting a third character that is controlled by a person connected to the game server from a different game client.

6. The game client of claim 1, wherein the computing system is further configured to time synchronize the server-rendered video game image with the client-rendered video game image.

7. The game client of claim 1, wherein the client-rendered video game image is generated by game code that is downloaded from the game server upon initiation of a game session.

8. A method for enabling a video game comprising character interactions within a remote gaming environment, the method comprising;
 receiving, at a game client, a first control input to direct targeting actions of a first character within the video game;
 receiving, at the game client, a second control input to direct targeting actions of a second character within the video game;
 processing, at the game client, part of the first control input data locally to generate a first client-rendered video game feature depicting the first character targeting a first specific game object that is not directly controlled by the first character;
 processing, at the game client, part of the second control input data locally to generate a second client-rendered video game feature depicting the second character targeting a second specific game object that is not directly controlled by the second character;
 receiving, at the game client, a server-rendered video game image from a game server on which the video game is running, the server-rendered video game image comprising the first specific game object and the second specific game object;
 receiving from the game server geometry data that describes a size and shape of the first and second specific game objects;
 determining that the first character is accurately targeting the first specific game object using the geometry data to calculate a location of the first specific game object;
 determining that the second character is inaccurately targeting the second specific game object using the geometry data to calculate a location of the second specific game object;
 rendering a first client-rendered video game feature that includes a first visible indication that the first specific game object is accurately targeted;
 rendering a second client-rendered video game feature that includes a second visible indication that the second specific game object is inaccurately targeted;
 compositing the first and second client-rendered video game features with the server-rendered video game image to form a rendered composite video that displays the first and second visible indications and the first and second game objects;
 outputting the rendered composite video to a display device.

9. The method of claim 8, wherein the processing is performed by game-specific code.

10. The method of claim 8, wherein the first client-rendered video game feature is an image of the first character and a targeting apparatus associated with the first character targeted on the first specific game object.

11. The method of claim 8, wherein the method further comprises:
 receiving an additional control input to contact the second specific game object;
 determining based on the geometry and present targeting information that a contact with the second specific game object occurred;
 communicating information describing the contact with the second specific game object to the game server.

12. The method of claim 11, wherein the second client-rendered video game feature is changed to comprises an indication that the second character successfully contacted the second game object.

13. The method of claim 8, wherein the first client-rendered video game feature is an image of the second character and a targeting apparatus associated with the second character moving to target the second specific game object.

14. The method of claim 13, wherein the targeting apparatus comprises a reticle.

15. One or more computer-storage media having computer-executable instructions embodied thereon that when executed by a computing device perform a method for enabling a video game comprising character interactions within a remote gaming environment, the method comprising;
 receiving, at a game server, a first control input from a client device to direct the game actions of a first character within the video game;
 receiving, at the game server, a second control input from the client device to direct the game actions of a second character within the video game;
 manipulating a video game running on the game server using the first control input and the second control input;
 communicating from the game server to the client device geometry data that describes a size and shape of a specific game object not controlled by the first control input or the second control input;
 receiving at the game server from the client device an indication that the first character contacted the specific game object;
 generating, at the game server, a server-rendered video game image of the video game that includes the specific game object but does not comprise rendered images of the first character or the second character; and
 communicating the server-rendered video game image to the game client.

16. The media of claim 15, wherein the method further comprises communicating to the game client a game code that renders latency-sensitive features.

17. The media of claim 15, wherein the specific game object is a third character controlled by a second client device.

18. The media of claim 15, wherein the server-rendered video game image comprises an indication that the first character successfully contacted the specific game object.

19. The media of claim 15, wherein the method further comprises communicating game state information.

20. The media of claim 15, wherein the images of the first character interacting with the game object comprise an indication that the first character released a projectile toward the game object.

* * * * *